Feb. 8, 1927.
R. S. BURDETTE
1,616,950
FLEXIBLE RULE
Filed June 26, 1923
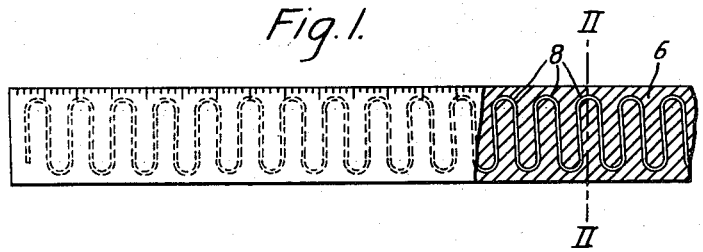
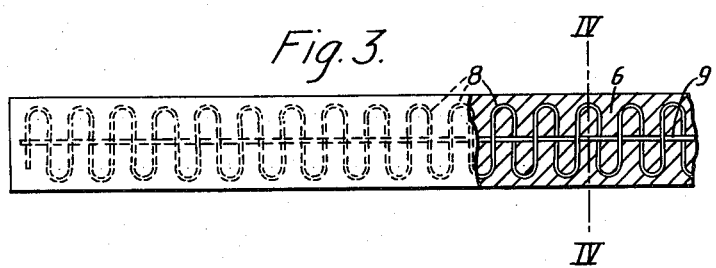
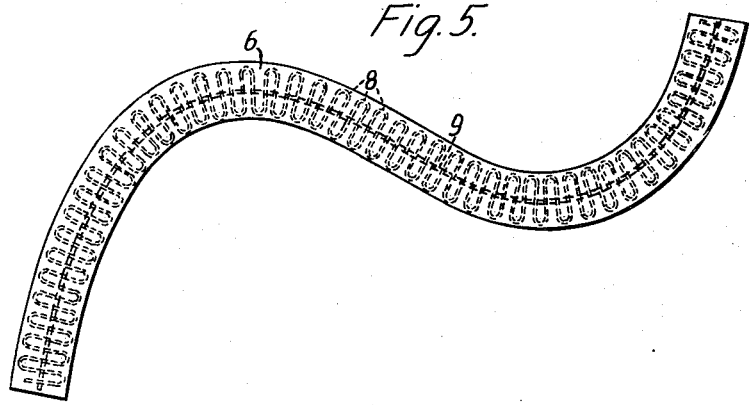
INVENTOR
Richard S. Burdette
BY
ATTORNEY Patented Feb. 8, 1927.

1,616,950

UNITED STATES PATENT OFFICE.

RICHARD S. BURDETTE, OF AKRON, OHIO.

FLEXIBLE RULE.

Application filed June 26, 1923. Serial No. 647,872.

My invention relates broadly to means for drawing any desired form of irregularly curved lines with precision. More specifically, my invention relates to a novel type of flexible rule which embodies a high degree of resiliency as well as a high degree of rigidity of form, and which is inextensible.

One object of my invention consists in providing a relatively inexpensive, durable, flexible rule, which shall be adaptable to any curve of any shape whatsoever. Another object of my invention is to provide a flexible rule which shall embody rigidity of form, inextensibility, and a smooth drawing surface. Other and ancillary objects are pointed out in the following description of my invention.

Heretofore, various types of irregular curve members have been employed for drawing irregularly curved lines among which are the rigid celluloid or steel curve members, sometimes known as French curves, and the flexible curve members having embedded therein a lead, soft copper, or other plastic non-resilient metal strip. The rigid curve members are objectionable because it is necessary to have a set of several thereof to meet the requirements of many irregular curves, and, at best, requires considerable trying and fitting to find the proper curve member and the proper portion thereof to employ. The flexible members having embedded therein a plastic metal member are objectionable on account of their relatively high cost, in addition to the fact that their life of service is relatively short. This is caused by the fact that the lead, or other plastic metal employed therein, breaks after being bent but a relatively few times. Since frequent bending is absolutely essential in this type of device, its life of service is of but short duration.

By my invention I have provided a device which avoids the objection of being rigid, but is sufficiently firm to permit drawing a perfectly smooth curve even when pressure is exerted thereagainst. Also, a device constructed in accordance with my invention is inexpensive, durable and not readily deformed.

For a more accurate description of my invention, reference may now be had to the accompanying drawings of which:

Fig. 1 is a view partially in elevation and partially in section of a flexible rule representing one form which my invention may assume;

Fig. 2 is a cross-sectional view of the structure illustrated in Fig. 1, the section being taken along the line II—II thereof;

Fig. 3 is a view partially in elevation and partially in section of a flexible rule representing another form which my invention may assume;

Fig. 4 is a cross-sectional view of the rule illustrated in Fig. 3, the section being taken along the line IV—IV thereof; and Fig. 5 is a view in elevation of a rule of the type illustrated in Figs. 3 and 4 shaped to conform to an irregular curve.

As illustrated in Fig. 1 and 2, my rule comprises a body 6 of resilient rubber of the desired form, which is preferably a relatively long flat member, which may be calibrated adjacent one edge thereof in any desired manner. A sinuously curved resilient member 8, preferably of spring steel, is centrally embedded within the rubber body 6. The separate convolutions of the member 8 are all of equal dimensions and are in alignment. The rubber body 6, composed of raw rubber, with the member 8 embedded therein, is placed in a mold and is vulcanized.

The fact that the rubber is cured causes it to present a smooth surface offering but very little resistance to the movement of a pencil or pen in contact therewith. The rubber body 6 and the embedded member 8, being both resilient, permit the member to be bent to any desired shape or contour in one or more planes for drawing curves therewith. The resiliency of the member causes it to regain its original shape on being released. The spring member 8 which is composed of relatively light wire serves to add rigidity to the rubber body of the rule without materially altering the flexibility thereof. This spring member may be bent to any desired configuration and serves to prevent buckling of the rubber body 6, when bent to a curve of very small radius, which would otherwise occur. Also, it causes the rubber to firmly resist deflection under pressure exerted thereagainst by a pencil. This permits the user to trace and retrace a line as often as may be desired without forming more than a single narrow line.

The structure illustrated in Figs. 3, 4 and 5 differs from that shown in Figs. 1 and 2 by the addition of a reinforcing member 9, herein illustrated as a steel wire which is substantially straight but is woven through alternate convolutions of the sinuously curved wire 8. The member 9 may be a cloth tape, a wire braid, or any other desired form of flexible reinforcing member, although a metallic wire is considered preferable. The member 9 need not necessarily be woven through the convolutions of the wire 8 but may be disposed entirely on one side thereof, the essential feature being that it reinforces the member in a longitudinal direction.

When the rule is bent, as illustrated in Fig. 5, the convolutions of the wire 8 adjacent one side of the rule move farther apart and the convolutions adjacent the opposite side move closer together but the central portions thereof are held in a substantially fixed relationship by the inextensible wire 9.

In using the rule, it is bent to any desired angle or contour and is held in that position while the curve is drawn. On releasing it, it immediately regains its original shape.

If desired, the rule may be provided with a beveled edge, which may, in some instances, be conducive to greater accuracy, but preferably, the edge is square. The advantage obtained by having the edge square is that the curved ends of the convolutions of the member 8 may extend into very close proximity to a square edge, but, on account of the reduction in thickness adjacent a beveled edge, the reinforcing wire may not extend into close proximity thereto.

The reinforcing members herein referred to as metallic wires, steel wires, etc., may be composed of steel, brass or any other desired metal, but steel wire plated with brass is believed to be the most desirable. The steel wire is most suitable on account of its great strength and resiliency. The brass plating thereon is preferable because rubber, when vulcanized in contact with brass or a brass plated object, forms a bond therewith which is greatly superior to that similarly formed with any other of the ordinary metals. These wires may be of any desired cross-section which will not interfere with the flexibility of the rule.

Thus, from the foregoing description, it will be apparent that I have provided a flexible rule capable of being used to draw any irregular curve in either one or more planes, Also, being inextensible, owing to the incorporation of the wire 9, it may be used for accurate measurement of surfaces other than flat. Also, the simplicity of the device renders it inexpensive to manufacture, and with the wires 8 and 9 concealed within the molded rubber body presents a pleasing appearance. Rigidity, without the loss of flexibility or resilience, is provided by the numerous points at which the ruler edge is reinforced by the member 8.

Although I have illustrated several forms which my invention may assume, and have described in detail the applications thereof, it will be apparent to those skilled in the art that it is not so limited but that various modifications and changes may be made therein without departing from the spirit of my invention or the scope of the appended claims.

What I claim is:

1. A rule comprising a pliant body member having embedded therein a resilient metallic member of sinuous contour.

2. A rule comprising a vulcanized rubber body having embedded therein a substantially longitudinally extending brass plated steel wire.

3. A rule comprising a rubber body having embedded therein a resilient metallic wire of sinuous contour, and a longitudinally disposed relatively straight flexible reinforcing member.

4. A rule comprising a relatively long flat rubber body having embedded therein a resilient metallic wire of sinuous contour disposed longitudinally thereof and a relatively straight wire interwoven with the sinuously curved wire and disposed longitudinally of the rule.

5. A rule comprising a relatively long flat rubber body having embedded therein a resilient metallic wire of sinuous contour, the individual convolutions of the wire being disposed at right angles to the longitudinal axis of the rule.

6. A rule comprising a relatively long flat rubber body having embedded therein a resilient metallic wire of sinuous contour, the individual convolutions of the wire being disposed at right angles to the longitudinal axis of the rule, and a relatively straight wire interwoven with the sinuously curved wire and disposed longitudinally of the rule.

7. A rule comprising a relatively long flat rubber member so reinforced as to be adapted to be flexed in a plurality of planes.

8. A member comprising a relatively long rubber body of relatively small cross-section having a substantially longitudinally extending flexible metallic wire embedded therein.

9. A member comprising a relatively long rubber body of relatively small cross-section, having embedded therein a longitudinally extending flexible metallic member of sinuous contour.

In witness whereof, I have hereunto signed my name.

RICHARD S. BURDETTE.